United States Patent
Ko et al.

(10) Patent No.: US 10,795,564 B2
(45) Date of Patent: Oct. 6, 2020

(54) CONTENT DISPLAY CONTROL METHOD AND USER TERMINAL FOR PERFORMING CONTENT DISPLAY CONTROL METHOD

(71) Applicant: KAKAO CORP., Jeju-si, Jeju-do (KR)

(72) Inventors: Seung Hyun Ko, Seoul (KR); Seul Ah Lee, Seoul (KR); Young Soo Kim, Jeju-si (KR)

(73) Assignee: KAKAO CORP., Jeju-si, Jeju-Do (KR)

( * ) Notice: Subject to any disclaimer, the term of this patent is extended or adjusted under 35 U.S.C. 154(b) by 252 days.

(21) Appl. No.: 15/573,130

(22) PCT Filed: May 11, 2016

(86) PCT No.: PCT/KR2016/004909
§ 371 (c)(1),
(2) Date: Nov. 10, 2017

(87) PCT Pub. No.: WO2016/182328
PCT Pub. Date: Nov. 17, 2016

(65) Prior Publication Data
US 2018/0129392 A1  May 10, 2018

(30) Foreign Application Priority Data

May 11, 2015 (KR) .................... 10-2015-0065579

(51) Int. Cl.
*G06F 3/0485* (2013.01)
*G06F 3/0488* (2013.01)

(52) U.S. Cl.
CPC ........ *G06F 3/0485* (2013.01); *G06F 3/04883* (2013.01)

(58) Field of Classification Search
CPC .................................................... G06F 3/0485
USPC ............................................................ 715/786
See application file for complete search history.

(56) References Cited

U.S. PATENT DOCUMENTS

| | | | |
|---|---|---|---|
| 6,408,316 B1 * | 6/2002 | Himmel | G06F 16/9562 715/206 |
| 6,523,037 B1 * | 2/2003 | Monahan | G06Q 10/10 |
| 8,484,187 B1 * | 7/2013 | Hong | G06F 16/248 707/706 |
| 8,645,370 B2 * | 2/2014 | Yu | G06F 16/951 707/728 |

(Continued)

FOREIGN PATENT DOCUMENTS

| | | |
|---|---|---|
| JP | 2008152456 A | 7/2008 |
| JP | 2014074981 A | 4/2014 |

(Continued)

OTHER PUBLICATIONS

International Search Report dated Aug. 11, 2016 for PCT/KR2016/004909, citing the above references.

*Primary Examiner* — Daniel Rodriguez
(74) *Attorney, Agent, or Firm* — Cantor Colburn LLP

(57) ABSTRACT

Disclosed are a content display control method and a user terminal for performing the content display control method. The content display control method enables a user to see a text and a content corresponding thereto at one time by fixing the content in a specific area of a screen as the user scrolls the screen. Also, the content display control method may unfix the content fixed in the screen when a text displayed on the screen according to the user's scrolling is irrelevant to the content.

14 Claims, 10 Drawing Sheets

(56) References Cited

U.S. PATENT DOCUMENTS

| | | | | |
|---|---|---|---|---|
| 2003/0208376 A1* | 11/2003 | Vennum | ............... | G06F 19/324 705/2 |
| 2005/0190280 A1* | 9/2005 | Haas | ............... | H04N 1/00448 348/333.05 |
| 2006/0106793 A1* | 5/2006 | Liang | ............... | G06F 16/3329 |
| 2006/0107205 A1* | 5/2006 | Makela | ............... | G06F 16/9577 715/246 |
| 2006/0277167 A1* | 12/2006 | Gross | ............... | G06F 16/9577 |
| 2009/0049385 A1* | 2/2009 | Blinnikka | ............... | G06F 3/0481 715/719 |
| 2010/0037138 A1* | 2/2010 | Shcherbakov | ....... | H04L 65/602 715/716 |
| 2010/0311445 A1* | 12/2010 | Kim | ............... | G06F 3/0485 455/466 |
| 2013/0145267 A1* | 6/2013 | Ramachandran | ... | G06F 3/04883 715/719 |
| 2013/0222435 A1* | 8/2013 | Choi | ............... | G06F 3/0485 345/684 |
| 2013/0239047 A1* | 9/2013 | Robichaud | ............ | G06F 3/0485 715/784 |
| 2013/0262968 A1* | 10/2013 | Gartman | ............. | G06Q 50/184 715/202 |
| 2013/0339830 A1* | 12/2013 | Yuan | ............... | G06F 3/04847 715/209 |
| 2013/0342482 A1* | 12/2013 | Kim | ............... | G06F 3/0416 345/173 |
| 2014/0129980 A1* | 5/2014 | Lee | ............... | G06F 3/04883 715/810 |
| 2014/0164987 A1* | 6/2014 | Kang | ............... | G06F 3/04883 715/784 |
| 2014/0223575 A1* | 8/2014 | Nandi | ............... | H04L 67/306 726/27 |
| 2014/0331170 A1* | 11/2014 | Hyun | ............... | G06F 3/0485 715/784 |
| 2014/0344055 A1* | 11/2014 | Sanghavi | ......... | G06Q 30/0267 705/14.55 |
| 2015/0220264 A1* | 8/2015 | Lewis | ............ | H04N 21/26258 715/716 |
| 2015/0227308 A1* | 8/2015 | Kim | ............... | G06F 3/04886 715/769 |
| 2015/0234561 A1* | 8/2015 | Kashima | ............. | G06F 16/957 715/784 |
| 2015/0278174 A1* | 10/2015 | Wang | ............... | G06F 40/14 715/234 |
| 2015/0324079 A1* | 11/2015 | Kashima | ............. | G06F 3/0485 715/784 |
| 2016/0082504 A1* | 3/2016 | Okochi | ................ | B22D 17/32 164/150.1 |
| 2016/0140626 A1* | 5/2016 | Agarwal | ........... | G06Q 30/0276 715/234 |
| 2016/0170576 A1* | 6/2016 | Brown | ............... | G06F 3/0482 715/784 |
| 2016/0225057 A1* | 8/2016 | Pellow | ............... | G06F 16/248 |

FOREIGN PATENT DOCUMENTS

| | | |
|---|---|---|
| JP | 5714145 B1 | 5/2015 |
| KR | 1020110108681 A | 10/2011 |
| KR | 1020130073016 A | 7/2013 |
| KR | 1020140074490 A | 6/2014 |
| KR | 1020150010406 A | 1/2015 |
| WO | 2014132882 A1 | 9/2014 |

* cited by examiner

CONTENT DISPLAY CONTROL METHOD AND USER TERMINAL FOR PERFORMING CONTENT DISPLAY CONTROL METHOD

TECHNICAL FIELD

Example embodiments relate to a content display control method and a user terminal that performs the content display control method, and more particularly, to a method and a device for controlling how contents are to be displayed on a screen based on a scroll input by a user.

BACKGROUND ART

A user may obtain necessary information by getting access to numerous documents including, for example, web-pages, through the Internet. A document may include contents in a multimedia form such as an image, a video, and a graph, and also texts that describe such contents.

However, a screen on which a document is to be displayed is limited in size, and thus all areas of the document may not be displayed on the screen at once. In addition, in a case of a document having a great amount of details to be displayed, a length of the document may be considerably longer than a vertical length of a display.

In such a case, due to such a limited vertical length of the display, contents and texts describing the contents may not be simultaneously displayed on a screen. Thus, a user may experience inconvenience while scrolling upwards or downwards to verify the contents and the texts.

Since a multimedia type of contents included in a document and texts describing the contents are scrolled linearly, a user may need to scroll repetitively to verify the contents and the texts. However, although the user repetitively scrolls, the contents and the texts may not be displayed simultaneously on a screen.

DISCLOSURE OF INVENTION

Technical Goals

Example embodiments provide a method and a device that may allow a user to view both a content and a text at once by fixing a content corresponding to a text in a certain area of a screen based on a scroll input by the user.

Example embodiments also provide a method and a device that may display a content and a text that are mutually associated with each other at once on a screen by, when a text and a content corresponding to the text are present, fixing the content on the screen until a user reads the text throughout while scrolling, and also by automatically unfixing the content from the screen when the user completes reading the text.

Example embodiments also provide a method and a device that may allow a user to verify, from a screen that is currently viewed by the user, a content and a text that are mutually associated with each other at once by, when a text displayed on the screen based on a scroll input by the user is not associated with a content fixed on the screen, unfixing the content and displaying another content associated with the text.

Technical Solutions

According to an example embodiment, there is provided a content display control method to be performed by a user terminal, the content display control method including determining whether a content satisfies a first control condition based on a scroll on a screen of the user terminal, fixing the content on the screen when the content satisfies the first control condition, moving a text corresponding to the content based on a scroll on the screen input after the content is fixed on the screen, determining whether the content satisfies a second control condition based on the movement of the text, and unfixing the content when the content satisfies the second control condition.

The unfixing of the content may include displaying the content such that an area of the screen in which the content is to be displayed is reduced or displaying the content such that the content automatically disappears from the screen, when a following scroll is input to the screen.

The text corresponding to the content may be a text associated with the content by analyzing at least one content and at least one text included in a document.

The determining of whether the content satisfies the first control condition may include determining that the content satisfies the first control condition when a start portion of the content is positioned in a first area of the screen by a scroll on the screen, and the determining of whether the content satisfies the second control condition may include determining that the content satisfies the second control condition when an end portion of the text corresponding to the content is positioned in a second area of the screen by a following scroll on the screen input after the content is fixed on the screen.

The determining of whether the content satisfies the first control condition may include determining that the content satisfies the first control condition when a start portion of the text corresponding to the content is positioned in a first area of the screen by a scroll on the screen, and the determining of whether the content satisfies the second control condition may include determining that the content satisfies the second control condition when an end portion of the text corresponding to the content is positioned in a second area of the screen by a following scroll on the screen input after the content is fixed on the screen.

The determining of whether the content satisfies the first control condition may include determining that the content satisfies the first control condition when a content link included in the text corresponding to the content is selected, and the determining of whether the content satisfies the second control condition may include determining that the content satisfies the second control condition when an end portion of the text corresponding to the content is positioned in an area of the screen by a following scroll on the screen input after the content is fixed on the screen.

The determining of whether the content satisfies the first control condition may include determining that the content satisfies the first control condition when an end portion of a first text corresponds to an end portion of a content corresponding to a second text, and the determining of whether the content satisfies the second control condition may include determining that the content satisfies the second control condition when a start portion of the second text separated from the first text by a blank area corresponds to a start portion of the content corresponding to the second text based on a following scroll on the screen.

The fixing of the content on the screen may include changing a form in which the content is displayed or highlighting a portion of the text that is associated with the content.

The fixing of the content on the screen may include displaying the text corresponding to the content not to cover the content based on a following input scroll until the content satisfies the second control condition.

According to another example embodiment, there is provided a content display control method to be performed by a user terminal, the content display control method including identifying at least one content and text included in a document, adding a tag corresponding to the content to a code of the document, setting a style associated with fixing the content in the tag, determining a scroll value by measuring a scroll generated on a screen of the user terminal, determining the content corresponding to the tag by comparing the determined scroll value and a position corresponding to a length of the content identified from the document, fixing the content corresponding to the tag on the screen of the user terminal, determining a length of the content fixed on the screen based on a change of the scroll value after the content is fixed, and unfixing the content from the screen based on the determined length of the content.

The fixing of the content may include displaying the text not to cover the fixed content based on a following input scroll until the content is unfixed.

The fixing of the content may include changing a form in which the content is displayed or highlighting a portion of the text that is associated with the content.

The scroll value may indicate how far the scroll has moved from an end portion of the screen, and the length of the content may be determined by excluding the scroll value from the position corresponding to the length of the content.

According to still another example embodiment, there is provided a user terminal including a processor configured to determine whether a content satisfies a first control condition or a second control condition based on a scroll on a screen, and a display configured to fix the content on the screen or unfix the content from the screen based on a command from the processor. When the content satisfies the first control condition, the processor may transmit, to the display, a command for fixing the content on the screen. When the content satisfies the second control condition as the text moves based on a scroll on the screen input after the content is fixed on the screen, the processor may transmit, to the display, a command for unfixing the content fixed on the screen.

According to yet another example embodiment, there is provided a user terminal including a processor configured to identify at least one content and text included in a document, add a tag corresponding to the content to a code of the document, set a style associated with fixing the content to the tag, determine a scroll value by measuring a scroll generated on a screen of the user terminal, determine the content corresponding to the tag by comparing the determined scroll value and a position corresponding to a length of the content identified from the document, fix the content corresponding to the tag on the screen of the user terminal, determine a length of the content fixed on the screen when the scroll value changes after the content is fixed, and unfix the content from the screen based on the determined length of the content, and a display configured to fix or unfix the content based on a command from the processor.

Advantageous Effects

According to example embodiments described herein, a user may view both a content and a text at once by fixing a content corresponding to a text in a certain area of a screen based on a scroll input by the user.

According to example embodiments described herein, a user may verify both a content and a text that are mutually associated with each other at once from a screen that is currently viewed by the user by, when a text displayed on the screen is not associated with a content fixed on the screen based on a scroll input by the user, unfixing the content and displaying another content associated with the text.

According to example embodiments described herein, both a content and a text that are mutually associated with each other may be simultaneously displayed on a screen by, when a text and a content corresponding to the text are present, fixing the content on the screen until a user reads the text throughout while scrolling, and also by automatically unfixing the content from the screen when the user completes reading the text.

BEST MODE FOR CARRYING OUT THE INVENTION

Figure 1:
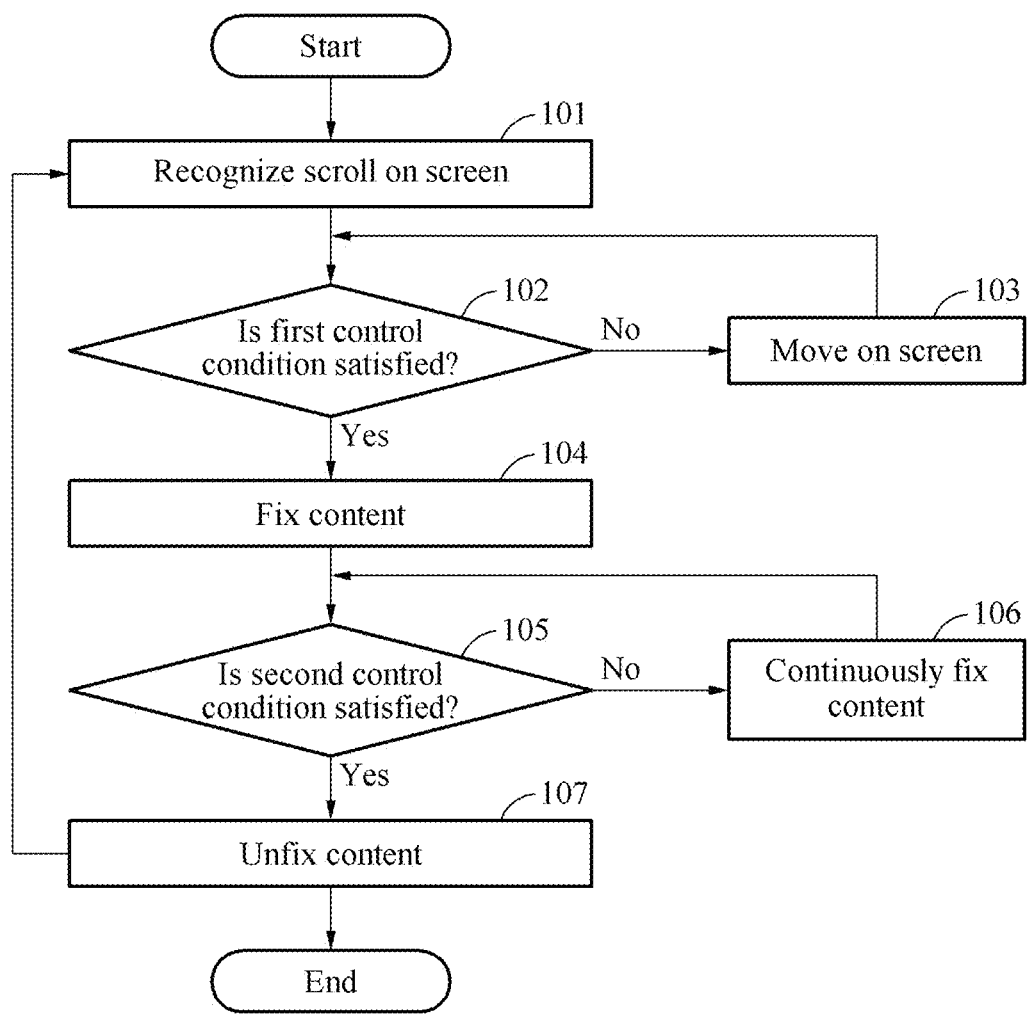
FIG. 1 is a flowchart illustrating a content display control method according to an example embodiment.

Reference will now be made in detail to example embodiments, examples of which are illustrated in the accompanying drawings, wherein like reference numerals refer to the like elements throughout.

FIG. 1 is a flowchart illustrating a content display control method according to an example embodiment.

According to an example embodiment, a content display control method may be performed by a user terminal that loads a document, for example, a web-page, and displays the loaded document. The document may include a content in a multimedia form, for example, an image, a video, and a graph, and a text describing the content. The content and the text associated with the content in the document may be present in successive positions or positions that are separate from each other.

In operation 101, the user terminal recognizes a scroll on a screen. A scroll used herein indicates an input that is made to the screen when a user of the user terminal directly touches the screen and drags it in a certain direction, an input that is made to the screen when the user operates a scroll bar displayed on the screen in a certain direction, an input that is made to the screen when the user makes a drag in a certain direction using an input device such as a pad, an input that is made to the screen when the user operates a wheel of an input device such as a mouse, and the like.

In other words, a scroll on the screen may include operations of all types performed by the user to verify a portion of a document displayed on the screen. In addition, a scroll on the screen may be input upwards or downwards on the screen. Based on such a scroll performed by the user on the screen, a scroll value may change. For example, when a document is initially loaded, a scroll value may be initialized to 0. Here, when an upward scroll is input to the screen, the scroll value may increase. Conversely, when a downward scroll is input to the screen, the scroll value may decrease. The user terminal may compare such a scroll value determined based on a scroll on the screen and a position of a content included in the document, and thus determine whether the content satisfies a control condition.

According to an example embodiment, in a case of a document that is long in a vertical direction, a scroll on the screen may be applied upwards and downwards. However, in a case of a document that is long in a horizontal direction, a scroll on the screen may be applied leftwards and rightwards. That is, the content display control method described herein may be applied both in a case in which a vertical length of a document is longer than a vertical length of a display provided in the user terminal, and in a case in which a horizontal length of a document is longer than a horizontal length of the display. Thus, the user terminal may allow the user to verify a portion of the document that is not currently displayed on the screen of the display of the user terminal when the user makes a drag on the screen, operates a scroll bar displayed on the screen, makes a drag using an input device such as a pad, or operates a wheel of an input device such as a mouse.

In operation 102, the user terminal determines whether the content satisfies a first control condition based on the scroll on the screen. The first control condition used herein may be applied to determine whether a start portion of the content or a start portion of a text corresponding to the content is positioned in a first area of the screen.

In operation 103, when the content does not satisfy the first control condition, the user terminal continuously moves a view of the document on the screen based on a scroll on the screen.

In operation 104, when the content satisfies the first control condition, the user terminal fixes the content on the screen. Here, fixing a content on a screen that is used herein indicates that, despite a following scroll input to the screen, only a view of remaining elements of the document, excluding the content, may move.

When the content is fixed on the screen, the user terminal may change a size of the content and display the content with the changed size on the screen. Alternatively, when the content is fixed on the screen, the user terminal may change a form in which the content is displayed, for example, a font, a color, and a shape, or highlight a portion of the text that is directly associated with the content, in order to notify the user that the content is fixed on the screen.

For example, a color of a portion of the content may be changed based on a detail of the text. In detail, when the detail of the text displayed on the screen based on a scroll on the screen changes, the color of the portion of the content may also change. Alternatively, the user terminal may apply a special effect to the content or perform highlighting to notify the user that the content is fixed on the screen.

Alternatively, the user terminal may highlight an entirety or a portion of the text that is associated with the content, thereby providing a highlighting effect to the text corresponding to the content.

In operation 105, the user terminal determines whether the content satisfies a second control condition based on a scroll on the screen. The text used herein may include details that describe the content.

A relationship between the content and the text may be determined as follows.

(i) The user terminal may indicate a relationship between a content and a text by adding a tag associated with the content corresponding to the text to a certain position of the text included in a document, which will be described in detail with reference to FIGS. 9 and 10.

(ii) The user terminal may map a text to each content in a document, and store the mapped text and content in a server. The user terminal may then retrieve, from the server, the content mapped to the text based on a scroll on the screen, and fix or unfix the content on or from the screen. When the content is fixed on or unfixed from the screen, the user terminal may then separately manage the text mapped to the content.

(iii) Also, by analyzing contents and texts in the user terminal or the server, a content and a text that are associated with each other may be connected. The user terminal may then automatically fix or unfix the content based on a scroll generated on the screen, and separately control the text connected to the content based on a state of the content.

The second control condition used herein may be applied to determine whether an end portion of the text corresponding to the content is positioned in a second area of the screen. The second area of the screen that is associated with the second control condition may be the same as or different from the first area of the screen that is associated with the first control condition.

In operation 107, the user terminal unfixes the content when the content satisfies the second control condition. In operation 106, the user terminal fixes the content continuously when the content does not satisfy the second control condition.

A start portion and an end portion that are described herein with reference to FIGS. 1 through 8 may be determined differently based on a scroll on the screen. For example, in a case in which a document is long in a vertical direction and a scroll on the screen is generated top to bottom, the start portion of the content may indicate an upper end of the content. Likewise, the start portion of the text corresponding to the content may indicate an upper end of the text. Conversely, the end portion of the content may indicate a lower end of the content, and the end portion of the text may also indicate a lower end of the text.

For another example, in a case in which a document is long in a horizontal direction and a scroll on the screen is generated left to right, the start portion of the content may indicate a leftmost end of the content, and the start portion of the text corresponding to the content may also indicate a leftmost end of the text. Conversely, the end portion of the content may indicate a rightmost end of the content, and the end portion of the text may also indicate a rightmost end of the text.

Here, in such a case in which the document is long in the horizontal direction, a scroll on the screen may also be generated right to left. In this case, the start portion of the content and the start portion of the text, and the end portion of the content and the end portion of the text may be described contrary to what is described in the foregoing.

The first area and the second area used herein may be defined as follows.

In a case in which a document is long in a vertical direction and a scroll moves top to bottom, the first area may indicate an upper end of the screen or an area separate from the upper end by a certain distance downwards, for example, an area separate from the upper end by 2 centimeters (cm) downwards. In a case in which a document is long in a horizontal direction and a scroll moves left to right, the first area may indicate a leftmost end of the screen or an area separate from the leftmost end by a certain distance rightwards, for example, an area separate from the leftmost end by 2 cm rightwards. Also, in a case in which a scroll moves right to left, the first area may indicate a rightmost end of the screen or an area separate from the rightmost end by a certain distance leftwards, for example, an area separate from the rightmost end by 2 cm leftwards.

The first area and the second area may be the same as each other or different from each other. For example, in a case in which the first area and the second area are different from each other, and a document is long in a vertical direction and a scroll is generated top to bottom, the second area may be positioned on a relatively lower side than the first area. Conversely, in a case in which a document is long in a horizontal direction and a scroll is generated left to right, the second area may be positioned relatively far right than the first area. Also, in a case in which a document is long in a horizontal direction and a scroll is generated right to left, the second area may be positioned relatively far left than the first area.

Operations to be performed on a single content specified in a document have been described above with reference to FIG. 1. However, in a case in which the document includes one or more contents and texts corresponding to the contents, the operations described above may be performed on another content, starting with operation 101 after operation 107 is completed.

The first control condition and the second control condition described above with reference to FIG. 1 will be described in greater detail with reference to FIGS. 2 through 8 where a mobile terminal such as a smartphone is provided as an example of the user terminal. However, any types of user terminals having a display with a length less than a length of a document may be applicable.

Figure 2:
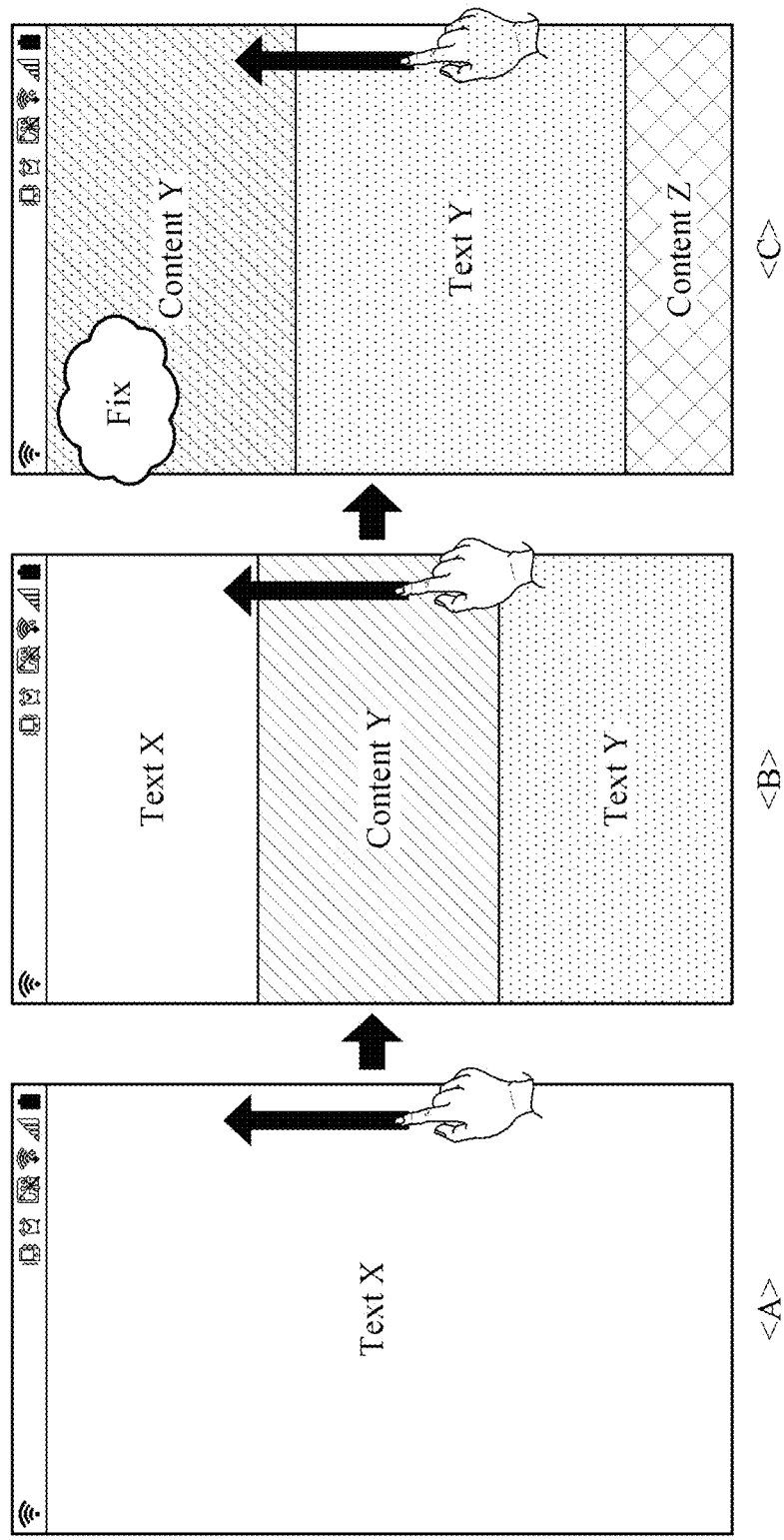
FIG. 2 is a diagram illustrating a content display control method according to a first example embodiment.

FIG. 2 is a diagram illustrating a content display control method according to a first example embodiment.

Figure 3:
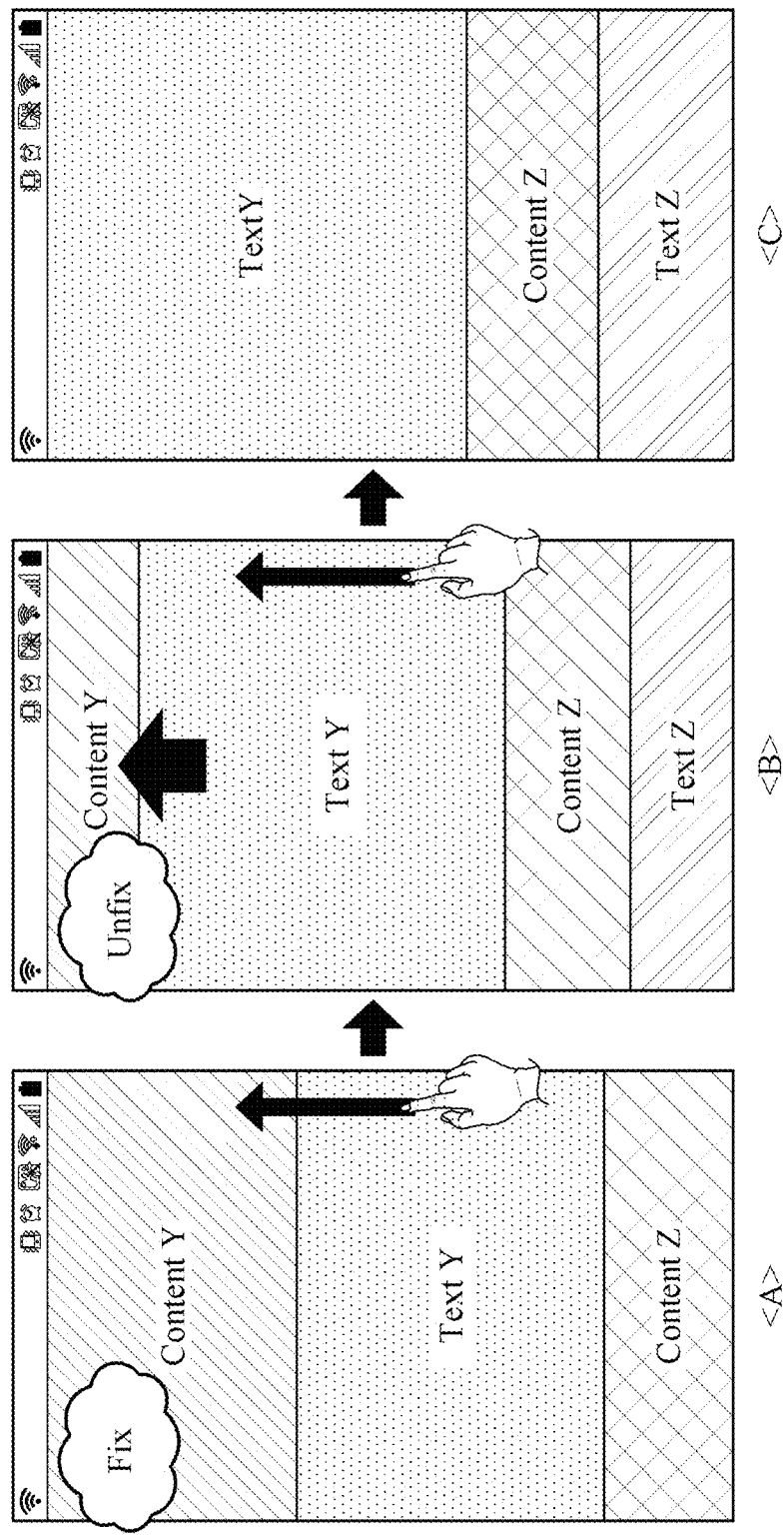
FIG. 3 is a diagram illustrating a content display control method according to the first example embodiment.

FIGS. 2 and 3 are diagrams illustrating a content display control method according to the first example embodiment. In the first example embodiment, a first control condition indicates whether a start portion of a content is positioned in a first area of a screen.

In addition, a second control condition indicates whether an end portion of a text corresponding to the content is positioned in a second area of the screen.

<A> of FIG. 2 illustrates a case in which a user directly touches a screen displayed on a display of a user terminal and scrolls upwards the screen. That is, <A> of FIG. 2 illustrates a case in which a scroll is input towards an upper end of the screen. In this case in which such an upward scroll is input to the screen, a view of a document, or a document view, may move upwards. In <A> of FIG. 2, only a text X is displayed on the screen.

When an upward scroll is continuously input to the screen afterwards, a content Y positioned under the text X and a text Y describing the content Y are displayed on the screen as illustrated in <B> of FIG. 2.

When an upward scroll is continuously input to the screen afterwards, a start portion of the content Y becomes positioned in a first area of the screen as illustrated in <C> of FIG. 2. Here, <C> of FIG. 2 illustrates a case in which a first control condition, which indicates whether a content is positioned in a certain area of the screen by a scroll on the screen, is satisfied.

As illustrated in <C> of FIG. 2, the first area of the screen may indicate an upper end of the screen. For example, the upper end of the screen may indicate an uppermost portion of a display of the user terminal or a position separate from the uppermost portion of the display by a certain distance downwards.

The user terminal may fix, at the upper end of the screen, the content Y satisfying the first control condition. That is, although an upward scroll is input to the screen after the content Y is fixed at the upper end of the screen, the user terminal may control the content Y not to move along the scroll on the screen.

However, in a case in which an upward scroll is input to the screen even after the content Y is fixed at the upper end of the screen, the user terminal may control the text Y associated with the content Y not to cover the content Y. For example, as illustrated in <C> of FIG. 2, the user terminal may provide an effect that the text Y appears to be displayed on a layer positioned under a layer of the content Y. Thus, from a start portion of the text Y to a certain portion thereof may be covered by the content Y fixed at the upper end of the screen.

However, although not illustrated in FIG. 2, in a case in which the user scrolls the screen downwards, or inputs a downward scroll, the user terminal may unfix the content Y from the screen. In detail, as the downward scroll is input to the screen after the content Y is fixed at the upper end of the screen, the start portion of the content Y may deviate from the first area of the screen and thus, the content Y may not satisfy the first control condition. That is, as the downward scroll is input, the content Y may no longer be positioned at the upper end of the screen due to the text X as illustrated in <B> of FIG. 2 and thus, the content Y may not satisfy the first control condition. Thus, in a case in which a scroll is input in an opposite direction to a direction of a scroll input when the content Y is fixed on the screen and the content Y does not satisfy the first control condition, the user terminal may unfix the content Y that is fixed on the screen.

However, in a case in which an upward scroll is input again after the content Y is unfixed and the content Y is then positioned again at the upper end of the screen, the content Y may satisfy the first control condition again and the user terminal may then fix the content Y at the upper end of the screen.

As described, a user terminal may allow a user to verify, at once, both a content included in a document and a text describing details associated with the content by moving a view of the document based on a scroll on a screen. The user terminal may verify a content on which the user focuses on the screen based on a scroll input by the user, and then fix the content at an upper end of the screen. In addition, the user terminal may control a text associated with the content fixed on the screen to move based on a scroll input by the user, albeit not to cover the content fixed on the screen, such that the user may verify both the content and the text on the screen at once.

FIG. 3 is a diagram illustrating a content display control method according to the first example embodiment.

FIG. 3 illustrates cases in which an upward scroll is input to a screen continuously after the cases illustrated in FIG. 2. <A> of FIG. 3 illustrates a case in which an upward scroll is input continuously after the content Y is fixed at an upper end of the screen as illustrated in <C> of FIG. 2.

In such a case, an end portion of the text Y is positioned in a second area of the screen as illustrated in <B> of FIG. 3. <B> of FIG. 3 illustrates a case in which, after a content is fixed on the screen, an end portion of a text associated with the content is positioned in the second area of the screen by a scroll on the screen, and thus the content satisfies a second control condition.

A user terminal may then unfix, from the screen, the content Y fixed at the upper end of the screen. That is, when the content Y is unfixed from the screen and an upward scroll is input to the screen, the user terminal may control the content Y to move upwards based on the scroll on the screen. Here, there is no blank area left at the upper end of the screen and also the content Y moves upwards, and thus an area of the screen in which the content Y is to be displayed may be reduced. That is, a length of the content Y to be displayed on the screen may be reduced. In addition, in a case in which such an upward scroll is continuously input to the screen, the content Y may disappear from the screen.

Also, in a case in which an upward scroll is input to the screen after the content Y is unfixed, the text Y describing the content Y may be displayed in various ways.

For example, in a case in which an upward scroll is input to the screen after the content Y is unfixed from the screen, the user terminal may control the text Y to cover the content Y. That is, the user terminal may provide an effect that the text Y appears to be displayed on an upper layer of a layer of the content Y. In such a case in which the upward scroll is input to the screen continuously after the content Y is unfixed from the screen, the text Y may cover some of the content Y from an end portion of the content Y to a certain portion thereof.

When this continues, the content Y may disappear from the screen by the text Y. Likewise, in a case in which an upward scroll is continuously input to the screen, the text Y may also disappear from the screen after the content Y disappears from the screen.

For example, in a case in which an upward scroll is input to the screen after the content Y is unfixed from the screen, the user terminal may control the text Y to push up the content Y to ascend. The content Y may then disappear from the screen by being pushed upwards by the text Y.

<C> of FIG. 3 illustrates a result shown after the content Y disappears from the screen. In a case in which an upward scroll is continuously input to the screen, a content Z may move upwards on the screen and a start portion of the content Z may be positioned in the first area of the screen. That is, the start portion of the content Z may reach the upper end of the screen.

The content Z may then satisfy the first control condition, similarly to the case illustrated in <B> of FIG. 2, and thus the user terminal may fix the content Z at the upper end of the screen. That is, the user terminal may control the content Z not to move along a scroll on the screen. After the content Z is fixed at the upper end of the screen as illustrated in <C> of FIG. 2, the user terminal may control a text Z associated with the content Z not to cover the content Z.

Also, in <B> of FIG. 3, in a case in which a downward scroll is input to the screen after the content Y is unfixed, a document view may move downwards on the screen. Thus, the second control condition indicating whether the end portion of the text Y associated with the content Y is positioned in the second area of the screen may not be satisfied. The user terminal may then fix again, at the upper end of the screen, the content Y that is unfixed from the screen. The first area of the screen for the first control condition that is described with reference to FIG. 2 and the second area of the screen for the second control condition that is described with reference to FIG. 3 may be different from each other.

As described, in a case in which a user desires to verify another content that is different from a content fixed on a screen while inputting a scroll to the screen, a user terminal may unfix the content fixed on the screen and allow the content to disappear from the screen based on the scroll input by the user. After the content fixed on the screen disappears from the screen by the scroll input by the user, the other content that the user desires to focus on may then be fixed on the screen such that the user may more conveniently view the content of interest at a current point.

Figure 4:
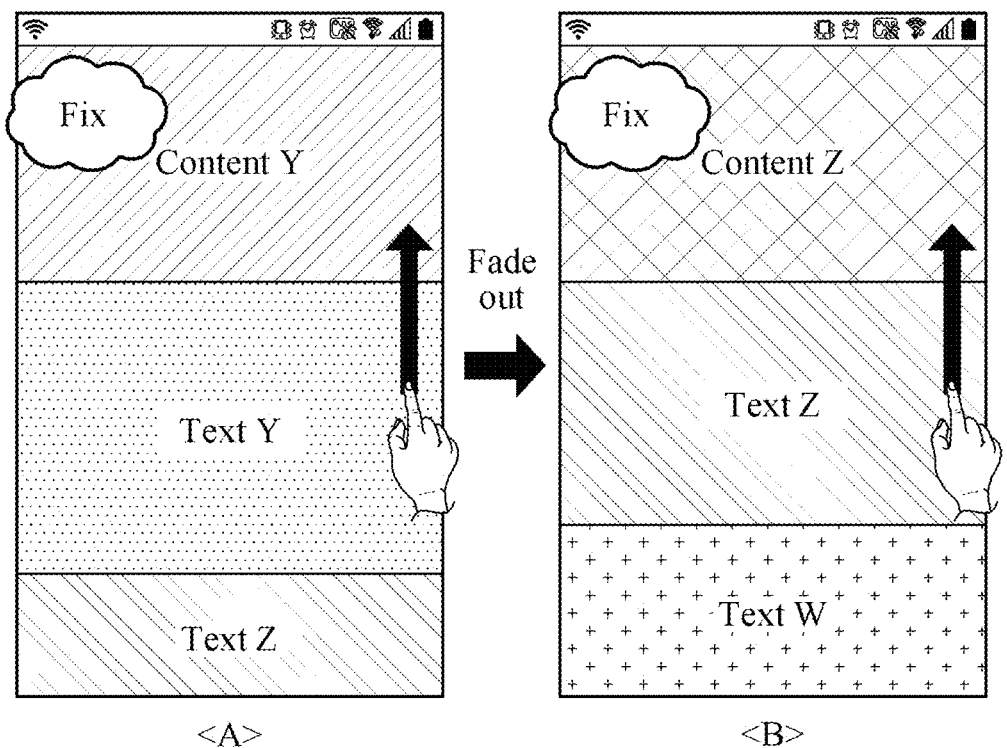
FIG. 4 is a diagram illustrating a content display control method according to a second example embodiment.

FIG. 4 is a diagram illustrating a content display control method according to a second example embodiment.

In FIG. 4, a first control condition associated with a content may indicate whether a start portion of a text corresponding to the content is positioned in a first area of a screen. For example, the first control condition may be satisfied when a start portion of the content is positioned at an upper end of the screen by a scroll moving upwards, when the start portion of the content is positioned at a leftmost end of the screen by a scroll moving leftwards, or when the start portion of the content is positioned at a rightmost end of the screen by a scroll moving rightwards. When the start portion of the text is positioned in the first area of the screen, the content corresponding to the text may satisfy the first control condition. A user terminal may then display, at the upper end of the screen, the content that satisfies the first control condition.

In addition, a second control condition associated with a content may indicate whether an end portion of a text corresponding to the content is positioned in a second area of a screen. When an end portion of a text corresponding to a content fixed at an upper end of the screen is positioned in the second area of the screen, the content corresponding to the text may satisfy the second control condition. The user terminal may then unfix, from the screen, the content that satisfies the second control condition.

Dissimilar to the cases illustrated in FIGS. 2 and 3, the screen may not be arranged in a sequence of content-text-content-text, but a sequence of text-text may also be applicable as illustrated in FIG. 4. Thus, that the end portion of the text corresponding to the content is positioned in the second area of the screen may indicate that a start portion of a text corresponding to another content is positioned in the first area of the screen.

That is, it may be determined that the other content different from the content fixed on the screen satisfies the first control condition. The user terminal may then unfix the content already fixed on the screen, and at the same time fix the other content on the screen. The user terminal may thus allow the previously fixed content to disappear from the screen, and at the same time display the content to be subsequently fixed on the screen, thereby providing a fade-out effect.

<A> of FIG. 4 illustrates a case in which a content is fixed at the upper end of the screen after an upward scroll is input to the screen.

For example, as illustrated in FIG. 4, in a case in which a text Y associated with a content Y is positioned in the first area of the screen, the content Y corresponding to the text Y may be fixed at the upper end of the screen. That is, the user terminal may determine whether a content satisfies the first control condition based on whether a start portion of a text corresponding to the content is positioned in the first area of the screen. In such an example, when an upward scroll is input to the screen continuously after the content Y is fixed at the upper end of the screen, the user terminal may control the text Y associated with the content Y not to cover the content Y. For which, reference may be made to the description provided above with reference to FIG. 2.

In a case in which an upward scroll is input to the screen continuously after the content Y is fixed at the upper end of the screen as illustrated in <B> of FIG. 4, a start portion of a text Z associated with a content Z may be positioned in the second area of the screen. Referring back to <A> of FIG. 4, the text Y and the text Z are arranged successively with each other on the screen, and thus that the start portion of the text Z is positioned in the second area of the screen may indicate that the end portion of the text Y corresponding to the content Y is positioned in the second area of the screen.

Since the end portion of the text Y is positioned in the second area of the screen, the user terminal may determine that the content Y satisfies the second control condition. Thus, the user terminal may unfix the content Y from the upper end of the screen. The content Y may then disappear from the screen immediately when the content Y is unfixed from the upper end of the screen.

In addition, since the start portion of the text Z is positioned in the first area of the screen, the user terminal may determine that the content Z satisfies the first control condition. The user terminal may then fix the content Z at the upper end of the screen. Here, the content Y may disappear from the screen when it is unfixed from the screen, and at the same time the content Z may be fixed on the screen. Referring to <B> of FIG. 4, the user terminal may allow the content Y to fade out such that the content Y disappears from the screen and the content Z is displayed, thereby unfixing the content Y from the upper end of the screen and concurrently fixing the content Z at the upper end of the screen.

In a case in which an upward scroll is input to the screen continuously after the content Z is fixed at the upper end of the screen as illustrated in <B> of FIG. 4, the user terminal may control the text Z associated with the content Z not to cover the content Z.

Also, in a case in which an upward scroll is input to the screen continuously after the content Z is fixed at the upper end of the screen, the end portion of the text Z may be positioned in the second area of the screen. A start portion of a text W that is arranged successively with the text Z on the screen may be positioned in a certain area of the screen.

The user terminal may then determine that the content Z satisfies the second control condition. Similarly, the user terminal may determine that the content W satisfies the first control condition. Thus, the user terminal may fix the content W on the screen while unfixing the content Z from the screen. The user terminal may allow the content Z to fade out such that the content Z disappears from the screen and the content W is displayed at the upper end of the screen.

Although FIG. 4 illustrates the cases in which an upward scroll is input to the screen, a downward scroll may also be input to the screen. In such a case, operations may be performed contrary to what is described above with reference to <A> and <B> of FIG. 4.

For example, in a case in which a downward scroll is input to the screen after the content Z is fixed as illustrated in <B> of FIG. 4, the end portion of the text Y may not be positioned in the second area of the screen and the start portion of the text Z may not be positioned in the second area of the screen, which means that the content Y corresponding to the text Y does not satisfy the second control condition and the content Z corresponding to the text Z does not satisfy the first control condition.

That is, the content Y unfixed from the screen may be fixed again on the screen, and the content Z fixed on the screen may be unfixed. Thus, in a case in which a downward scroll is input to the screen after the content Z is fixed on the screen as illustrated in <B> of FIG. 4, the content Y previously faded out of the screen may be displayed again at the upper end of the screen and fixed on the screen as illustrated in <A> of FIG. 4. In addition, the content Z previously fixed at the upper end of the screen as illustrated in <B> of FIG. 4 may fade out of the screen to disappear from the screen.

Figure 5:
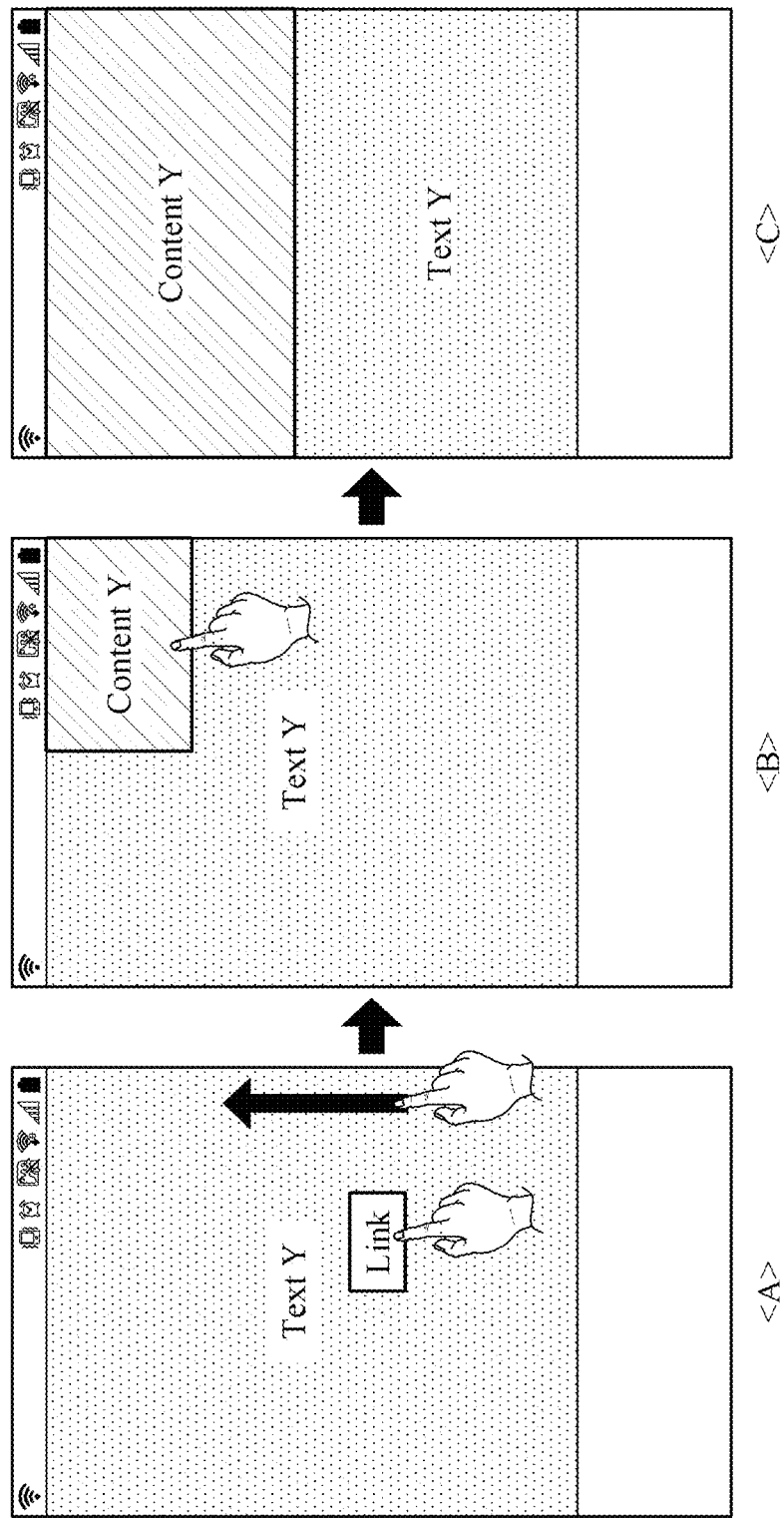
FIG. 5 is a diagram illustrating a content display control method according to a third example embodiment.

FIG. 5 is a diagram illustrating a content display control method according to a third example embodiment.

In FIG. 5, a first control condition associated with a content may indicate whether a content link included in a text corresponding to the content is selected. That is, in a case in which the content link included in the text is selected, the content may satisfy the first control condition. A user terminal may then fix the content that satisfies the first control condition at an upper end of a screen to display the content.

In addition, a second control condition associated with the content may indicate whether an end portion of the text corresponding to the content is positioned in a second area of the screen. In a case in which the end portion of the text corresponding to the content fixed at the upper end of the screen is positioned in the second area of the screen, the content corresponding to the text may satisfy the second control condition. The user terminal may then unfix, from the screen, the content that satisfies the second control condition.

Referring to <A> of FIG. 5, a link is indicated in a text Y. The text Y may correspond to a content Y, and the link may indicate at least one word among a plurality of words included in the text Y. In a case in which a user selects the link indicated in the text Y, the content Y corresponding to the text Y may be fixed at the upper end of the screen as illustrated in <B> of FIG. 5. That the user selects the link indicated in the text Y may indicate that the first control condition associated with the content Y is satisfied. The user terminal may then fix, at the upper end of the screen, the content Y that satisfies the first control condition.

When the content Y is displayed at the upper end of the screen, the content Y may be displayed with a width in a horizontal direction being less than a width of the screen in the horizontal direction. Also, when the content Y is selected as illustrated in <B> of FIG. 5, the content Y may be enlarged as illustrated in <C> of FIG. 5. In detail, the content Y may be enlarged to an extent that the width thereof becomes the same as the width of the screen.

In <C> of FIG. 5, in a case in which the user inputs an upward scroll to the screen, an end portion of the text Y may be positioned in a certain area of the screen. That the end portion of the text Y is positioned in the area of the screen may indicate that the content Y corresponding to the text Y satisfies the second control condition. The content Y may then disappear from the screen after being unfixed from the screen.

Figure 6:
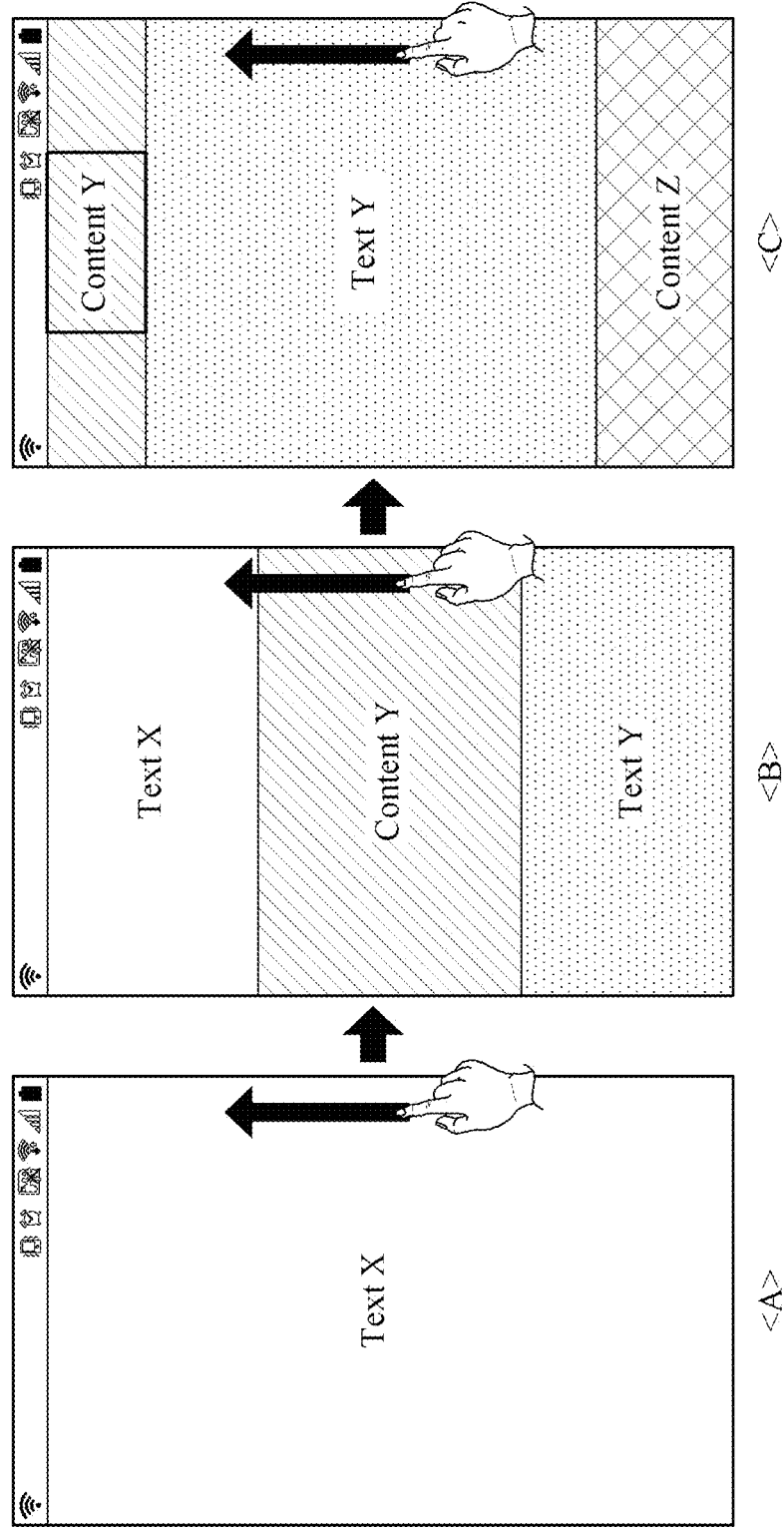
FIG. 6 is a diagram illustrating a content display control method according to a fourth example embodiment.

FIG. 6 is a diagram illustrating a content display control method according to a fourth example embodiment.

In FIG. 6, a first control condition associated with a content may indicate whether a start portion of the content is positioned in a first area of a screen. In a case in which the start portion of the content is in contact with an upper end of the screen, a user terminal may determine that the content satisfies the first control condition. The user terminal may then fix, at the upper end of the screen, the content satisfying the first control condition.

Here, dissimilar to the cases illustrated in FIGS. 2 and 3, the content to be fixed on the screen may be displayed on the screen with a size reduced from an original size thereof. Here, a remaining portion, excluding a portion of the content to be displayed, may be adjusted by its transparency.

In addition, a second control condition associated with the content may indicate whether an end portion of a text corresponding to the content is positioned in a second area of the screen. In a case in which the end portion of the text is positioned in the second area of the screen based on a scroll on the screen input after the content is fixed on the screen, the user terminal may then determine that the content fixed on the screen satisfies the second control condition and unfix the content from the screen.

<A> of FIG. 6 illustrates a case in which an upward scroll is input on the screen. In such a case, only a text X is displayed on the screen. In a case in which an upward scroll is input to the screen continuously after the case illustrated in <A> of FIG. 6, a content Y positioned under the text X and a text Y corresponding to the content Y may be displayed on the screen as illustrated in <B> of FIG. 6.

In a case in which an upward scroll is input to the screen continuously after the case illustrated in <B> of FIG. 6, a start portion of the content Y may come in contact with the upper end of the screen. The user terminal may then determine that the content Y satisfies the first control condition. Thus, the user terminal may fix, at the upper end of the screen, the content Y that satisfies the first control condition to display the content Y. Referring to <C> of FIG. 6, when the content Y is fixed at the upper end of the screen, the content Y may be displayed on the screen with a size reduced from an original size of the content Y.

In a case in which an upward scroll is input to the screen continuously after the content Y is fixed at the upper end of the screen, the text Y may move upwards on the screen. However, in such a case in which the upward scroll is input to the screen after the content Y is fixed at the upper end of the screen, the user terminal may control the text Y associated with the content Y not to cover the content Y. For example, the user terminal may provide an effect that the text Y appears to be displayed in a layer present under a layer of the content Y. Thus, some of the text Y from a start portion of the text Y to a certain portion thereof may be covered by the content Y fixed at the upper end of the screen.

However, in the case illustrated in <C> of FIG. 6, the content Y may be displayed on the screen with a smaller size than the original size thereof, dissimilarly to the case illustrated in <C> of FIG. 2, and thus a remaining portion excluding a portion covered by the content Y at the upper end of the screen may be adjusted in its transparency. Based on the transparency of the remaining portion, the text Y may be verified by the user.

In a case in which an upward scroll is continuously input to the screen, the end portion of the text Y may be positioned in the second area of the screen. Thus, the content Y may satisfy the second control condition, and the user terminal may then unfix the content Y from the screen.

Although not illustrated in FIG. 6, in a case in which a downward scroll is input to the screen after the content Y is fixed at the upper end of the screen, the user terminal may unfix the content Y from the screen because the content Y is no longer positioned at the upper end of the screen in response to the downward scroll being input to the screen and the content Y does not satisfy the first control condition accordingly.

However, in a case in which an upward scroll is input again to the screen and the content Y is positioned again at the upper end of the screen, the user terminal may then fix the content Y again at the upper end of the screen.

Figure 7:
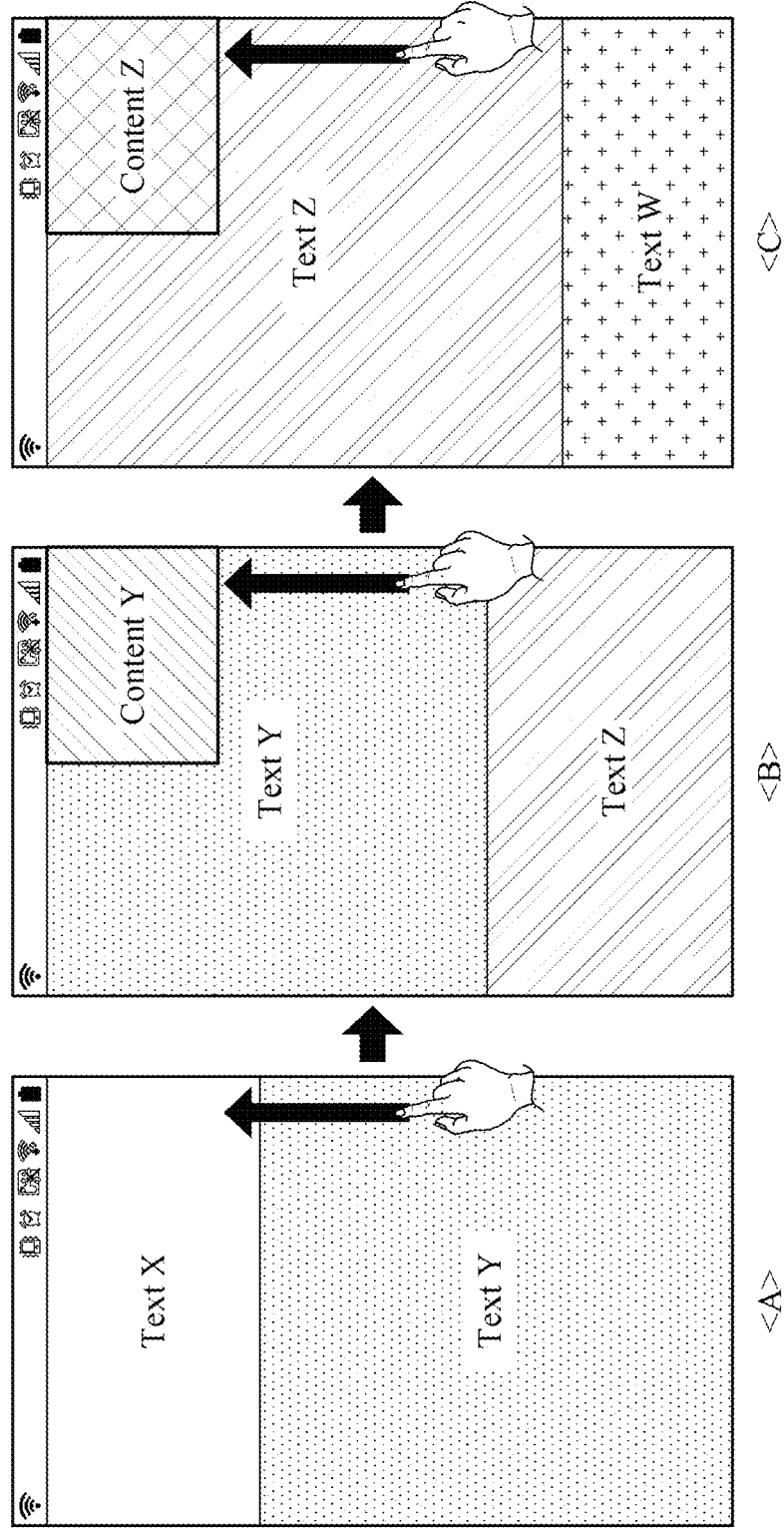
FIG. 7 is a diagram illustrating a content display control method according to a fifth example embodiment.

FIG. 7 is a diagram illustrating a content display control method according to a fifth example embodiment.

In FIG. 7, a first control condition indicates whether a start portion of a text corresponding to a content is positioned in a first area of a screen. In addition, a second control condition indicates whether an end portion of the text corresponding to the content is positioned in a second area of the screen. The first area corresponding to the first control condition and the second area corresponding to the second control condition may be the same to each other or different from each other.

In FIG. 7, it is assumed that a content is not directly arranged on a document to be displayed on the screen, but only a text corresponding to the content is arranged on the document. <A> of FIG. 7 illustrates a case in which a text X and a text Y are successively arranged on the screen. In such a case, it is assumed that an upward scroll is input to the screen.

As illustrated in <B> of FIG. 7, the text X may disappear from the screen, and a start portion of the text Y may be positioned in the first area of the screen. A user terminal may then determine that a content Y corresponding to the text Y satisfies the first control condition. In such a case, the user terminal may fix, at an upper end of the screen, the content Y that satisfies the first control condition. The content Y may be displayed at the upper end of the screen in a size smaller than an original size thereof. Here, in a case in which the content Y fixed on the screen is selected, the content Y may be displayed in its original size.

As illustrated in <B> of FIG. 7, an upward scroll may be input to the screen continuously after the content Y is fixed at the upper end of the screen. The text Y corresponding to the content Y may be displayed while moving along the scroll on the screen. Here, the text Y may be displayed not to cover the content Y.

An upward scroll may be input to the screen continuously after the content Y is fixed at the upper end of the screen as illustrated in <B> of FIG. 7. Then, as illustrated in <C> of FIG. 7, an end portion of the text Y may be positioned in the second area of the screen. The user terminal may then determine that the content Y corresponding to the text Y satisfies the second control condition. Also, a start portion of a text Z corresponding to a content Z may be positioned in the first area of the screen. The user terminal may then determine that the content Z corresponding to the text Z satisfies the second control condition.

As illustrated in <C> of FIG. 7, the user terminal may control the content Y that is displayed at the upper end of the screen to be unfixed and disappear from the screen. At the same time, the user terminal may fix the content Z corresponding to the text Z at the upper end of the screen to display the fixed content Z.

In a case in which an upward scroll is input to the screen continuously after the content Z is fixed on the screen, the text Z corresponding to the content Z may move upwards along the screen. Here, the text Z may be displayed not to cover the content Z fixed on the screen. In detail, the text Z may be displayed in a layer under a layer of the content Z.

Although not illustrated in FIG. 7, in a case in which a downward scroll is input to the screen after the content Y is fixed at the upper end of the screen, the user terminal may unfix the content Y from the screen. In response to the downward scroll being input to the screen, the text Y may move downwards, and accordingly the start portion of the text Y may not allow the content Y to satisfy the first control condition. However, in a case in which an upward scroll is input again to the screen and the start portion of the text Y is positioned in the first area of the screen, the content Y may satisfy the first control condition and the user terminal may then fix the content Y at the upper end of the screen.

Figure 8:
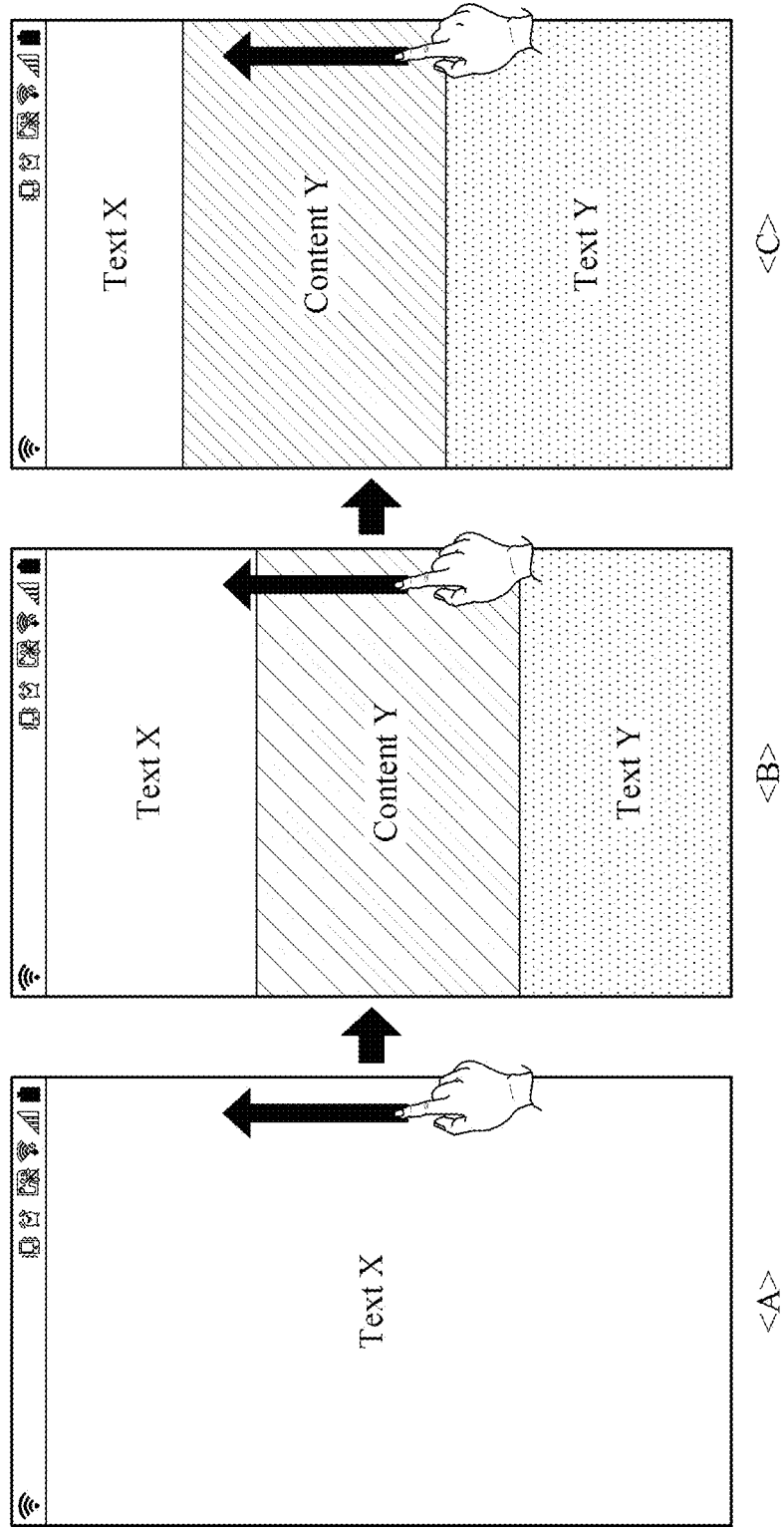
FIG. 8 is a diagram illustrating a content display control method according to a sixth example embodiment.

FIG. 8 is a diagram illustrating a content display control method according to a sixth example embodiment.

Dissimilar to the control conditions described above with reference to FIGS. 2 through 7, it is assumed that a text and a content are configured in different layers in FIG. 8. In detail, it is assumed that the text is present in an upper layer, and the content is present in a lower layer. In addition, it is assumed that a blank area is present between texts corresponding to the content. That is, it is assumed that the texts are not arranged successively with each other, but the blank area, which is an area open by a certain range, is present between the texts. Here, in a case in which a text moves based on a scroll on the screen and the blank area moves accordingly, the content positioned in the lower layer of a layer of the text may be displayed through the blank area.

In FIG. 8, a first control condition indicates whether an end portion of a first text corresponds to an end portion of a content corresponding to a second text. In addition, a second control condition indicates whether a start portion of the second text that is separated from the first text by a blank area corresponds to a start portion of the content corresponding to the second text. Here, the content corresponding to the second text may be displayed, on the screen, through blank area from a point in time at which the first control condition is satisfied to a point in time at which the second control condition is satisfied.

In <A> of FIG. 8, it is assumed that only a text X is currently displayed on the screen. Here, in a case in which an upward scroll is input by a user to the screen, the text X may move upwards along the scroll on the screen. An end portion of the text X may then correspond to an end portion of a content Y corresponding to a text Y. Thus, the first control condition associated with the content Y may be satisfied, and accordingly the content Y may be displayed through the blank area.

Referring to <B> of FIG. 8, the content Y in a document may be displayed through the blank area between the text X and the text Y from a point in time at which the first control condition associated with the content Y is satisfied. Although an upward scroll is continuously input to the screen as illustrated in <C> of FIG. 8, the content Y in the document may be displayed through the blank area between the text X and the text Y until the second control condition associated with the content Y is satisfied.

As described above, the second control condition associated with the content Y may indicate whether a start portion of the text Y corresponds to a start portion of the content Y. When the second control condition associated with the content Y is satisfied, the content Y may not be displayed on the screen. That is, a content covered by a text may be displayed through a blank area from a point in time at which the first control condition is satisfied to a point in time at which the second control condition is satisfied.

Figure 9:
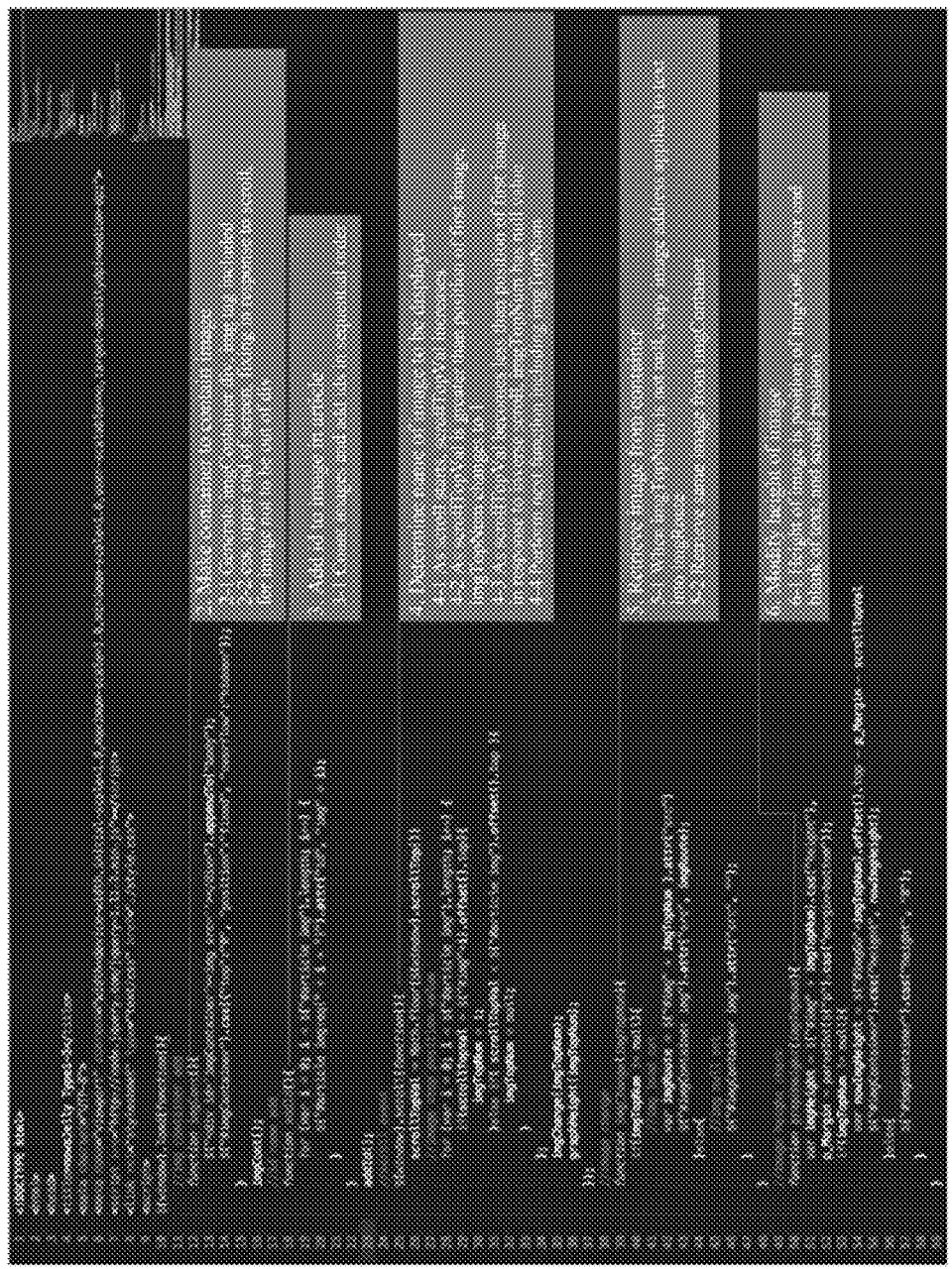
FIG. 9 is a diagram illustrating a first source code associated with a content display control method according to an example embodiment.

FIG. 9 is a diagram illustrating a first source code associated with a content display control method according to an example embodiment.

According to an example embodiment, details described with reference to FIGS. 2 through 8 may be represented by a source code of a document. Here, in a case of a content being an image, indicating an image in a document may be described as a source code. Hereinafter, a case in which a control condition associated with a content is satisfied and the content is thus fixed on a screen will be described.

An "imgContainer" div may be added to a hyper text markup language (HTML) document including a source code. The "imgContainer" div refers to a tag corresponding to a content, for example, an image and a text, and generally used without a special attribute. A CSS(Cascading Style Sheets) indicating an uppermost end of the screen, a fixed position, and unresponsiveness to a scroll may be added to the imgContainer. The CSS may be a sheet in which an entire style of a web-page indicating the document is stored in advance, and include various conditions for fixing a content. The "imgContainer" div may perform a function of including an image when a content satisfies a control condition.

Subsequently, the number of images present in the HTML document may be determined, and names of the images may be added. Here, a name may indicate information used to identify an image, which is a content. A user terminal may add "0" to a first image as a name thereof, and "1" to a second image as a name thereof.

A scroll value of a scroll generated on the screen may then be measured. When the document is initially loaded, a scroll value, for example, "scrollTopVal" is 0. The scroll value may increase when a user scrolls top to bottom on the screen of a display of the user terminal, and the scroll value may decrease when the user scrolls bottom to top on the screen. When a scroll is generated top to bottom on the screen of the display in response to such an action performed by the user, the scroll value may increase based on the scroll. Conversely, when a scroll is generated bottom to top on the screen of the display in response to such an action performed by the user, the scroll value may decrease based on the scroll. When the scroll value increases gradually by a scroll input by the user and the scroll value becomes greater than a position of the first image having the name of 0 on the screen, the first image may be fixed on the screen of the display.

Here, a variable, "imgTopNum" may be added. The "imgTopNum" refers to null. When the scroll value increases by a scroll input by the user to be greater than or equal to a position on the screen corresponding to a length of the first image of 0, the "imgTopNum" may become 0. In addition, when the scroll value increases continuously to be greater than or equal to a position on the screen corresponding to a length of the second image of 1, the "imgTopNum" may become 1.

Subsequently, an image may be added to the "imgContainer". As described above, when the "imgTopNum" is 0, the first image of 0 may be added to the "imgContainer".

Subsequently, when a length of an image indicated in an img tag on the screen changes and there is no need for the image fixed on the screen to be displayed on the screen, the image may disappear from the screen. Here, a length of an image may be a value obtained by subtracting a scroll value from a length of "imgGo#."

For example, in a case in which a position of an image "imgGo0" on the screen is 1000 px and a scroll value is 500 px, "imgGo0" may not be displayed on the screen, or a certain portion of "imgGo0" may be displayed on the screen based on a length of "imgGo0". In a case in which the length of "imgGo0" is 500 px and the position of "imgGo0" on the screen is 1000 px, and a scroll value is 500 px, an entirety of "imgGo0" may be displayed on the screen.

In a case in which a scroll value is 1000 px based on a scroll input by the user, "imgGo0" may be positioned at an uppermost end of the screen. Here, since a length of an area in which "imgGo0" is to be displayed on the screen is 0 px, "imgGo0" may not be displayed on the screen. "nowImgHeight" refers to a length of an area in which an image is to be displayed on the screen. The "nowImgHeight" may be determined based on a position of the image on the screen, a length of an area present between an upper end of the screen and the image, and a scroll value. In a case in which a length of the area in which the image is to be displayed on the screen changes based on a scroll, the "nowImgHeight" may also change.

Figure 10:
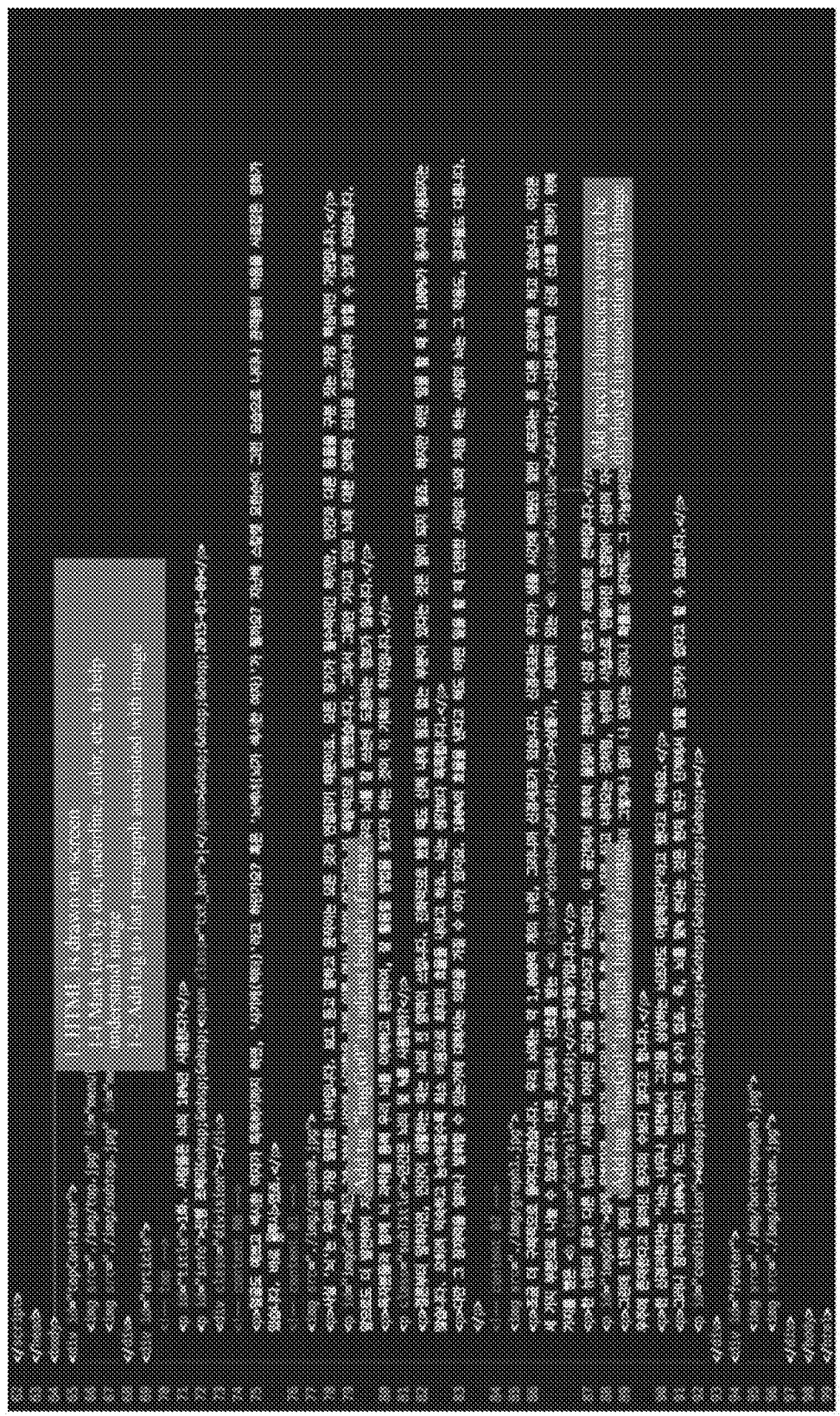
FIG. 10 is a diagram illustrating a second source code associated with a content display control method according to an example embodiment.

FIG. 10 is a diagram illustrating a second source code associated with a content display control method according to an example embodiment.

According to an example embodiment, a source code associated with a content display control method may be provided.

A user terminal may display a document represented in an HTML on a screen. In a case in which the document displayed on the screen includes an image and a text corresponding to the image, the user terminal may add a tag associated with the image corresponding to the text to a certain position, for example, a last paragraph, of the text. There are various methods to add such a tag.

In the HTML, a text and an image may be input generally using a p tag and an img tag, respectively. In a case in which the p tag corresponding to the text that corresponds to the image is present subsequent to the img tag corresponding to the image, a name "imgGo#" may be added to a corresponding p tag. For example, in a case in which a text corresponding to a first image of "0" is present subsequent to an img tag corresponding to the first image, "imgGo0" may be added to a p tag corresponding to the text.

In addition, the user terminal may add a name, for example, "dotRed," "dotBlue," and "dotYellow," to a source code for a word associated with the image. A color and a shape corresponding to the name may be specified in a CSS. Due to such a color and a shape, how a content is represented with an image being fixed may be determined.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM).

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A content display control method to be performed by a user terminal, the content display control method comprising:

determining whether a first content or a first text disposed outside the first content and describing the first content satisfies a first control condition based on a first scroll on a screen of the user terminal;
fixing the first content on the screen when the first control condition is satisfied;
moving the first text based on a second scroll on the screen input after the first content is fixed on the screen;
determining whether the first text satisfies a second control condition based on the movement of the first text;
unfixing the first content when the first text satisfies the second control condition; and
disappearing, for the first content, from the screen by pushing the first content upwards or covering the first content by the first text after the unfixing of the first content,
wherein the determining of whether the first text satisfies the second control condition comprises determining that an end portion of the first text describing the first content is positioned in a second area of the screen by a third scroll on the screen input after the first content is fixed on the screen,
a condition for fixing a second content based on a fourth scroll includes that the first content disappears completely from the screen by pushing the first content upwards or covering the first content by the first text, and
the second content is separate from the first content and described by a second text that is disposed outside the second content and separate from the first text.

2. The content display control method of claim 1, wherein the disappearing, for the first content, from the screen comprises:
disappearing, for the first content, from the screen by covering the first content from an end portion of the first content by the first text after the unfixing of the first content.

3. The content display control method of claim 1, wherein the first text is a text associated with the first content by analyzing at least one content and at least one text included in a document.

4. The content display control method of claim 1, wherein the determining of whether the first content or the first text satisfies the first control condition comprises:
determining that the first content or the first text satisfies the first control condition when a start portion of the first content is positioned in a first area of the screen by the first scroll on the screen.

5. The content display control method of claim 1, wherein the determining of whether the first content or the first text satisfies the first control condition comprises:
determining that the first content or the first text satisfies the first control condition when a start portion of the first text disposed outside the first content is positioned in a first area of the screen by the first scroll on the screen.

6. The content display control method of claim 1, wherein the determining of whether the first content or the first text satisfies the first control condition comprises:
determining that the first content or the first text satisfies the first control condition when a content link included in the first text is selected.

7. The content display control method of claim 1, wherein the fixing of the first content on the screen comprises:
changing a shape or a size of the first content displayed or highlighting in the first text a portion of the first text that is associated with the first content.

8. The content display control method of claim 1, wherein the fixing of the first content on the screen comprises:
displaying the first text not to cover the first content based on the second scroll until the first text satisfies the second control condition.

9. A content display control method to be performed by a user terminal, the content display control method comprising:
identifying a content and a text included in a document, the text describing the content;
adding a tag corresponding to the content to a code of the document;
setting a style associated with fixing the content in the tag;
determining a scroll value by measuring a scroll generated on a screen of the user terminal;
comparing the determined scroll value and a position corresponding to a length of the content identified from the document;
fixing the content on the screen of the user terminal when the determined scroll value is greater than the position corresponding to the length of the content;
determining whether a length change of the content fixed on the screen corresponds to a predetermined value based on a change of the scroll value after the content is fixed;
unfixing the content from the screen based on the determined length change of the content; and
disappearing, for the content, from the screen by covering the content from an end portion of the content by the text after the unfixing of the content,
wherein the determining of whether the length change of the content corresponds to the predetermined value comprises determining that an end portion of the text describing the content is positioned in a predetermined area of the screen by the change of the scroll value after the content is fixed.

10. The content display control method of claim 9, wherein the fixing of the content comprises:
displaying the text not to cover the fixed content based on a following input scroll until the content is unfixed.

11. The content display control method of claim 9, wherein the fixing of the content comprises:
changing a shape or a size of the content displayed or highlighting a portion of the text that is associated with the content.

12. The content display control method of claim 9, wherein the scroll value indicates how far the scroll has moved from an end portion of the screen, and
the length of the content is determined by excluding the scroll value from the position corresponding to the length of the content.

13. A user terminal comprising:
a processor configured to:
determine whether a first content or a first text disposed outside the first content and describing the first content satisfies a first control condition based on a first scroll on a screen of the user terminal;
fix the first content on the screen when the first control condition is satisfied;
move the first text based on a second scroll on the screen input after the first content is fixed on the screen;
determine whether the first text satisfies a second control condition based on the movement of the first text;
unfix the first content when the first text satisfies the second control condition; and
cause the first content to disappear from the screen by pushing the first content upwards or covering the first content by the first text after the unfixing of the first content, wherein the determining of whether the first text satisfies the second control condition comprises determining that an end portion of the first text describing the first content is positioned in a second area of the screen by a third scroll on the screen input after the first content is fixed on the screen, determine whether a third control condition for fixing a second content is satisfied based on a fourth scroll wherein the third control condition includes that the first content disappears completely from the screen by pushing the first content upwards or covering the first content by the first text, and the second content is separate from the first content and is described by a second text that is disposed outside the second content and separate from the first text.

14. A user terminal comprising:

a processor configured to identify a content and a text included in a document, wherein the text describes the content, add a tag corresponding to the content to a code of the document, set a style associated with fixing the content to the tag, determine a scroll value by measuring a scroll generated on a screen of the user terminal, compare the determined scroll value and a position corresponding to a length of the content identified from the document, fix the content on the screen of the user terminal when the determined scroll value is greater than the position corresponding to the length of the content, determine whether a length change of the content fixed on the screen corresponds to a predetermined value when the scroll value changes after the content is fixed, unfix the content from the screen based on the determined length change of the content, cause the content to disappear from the screen by covering the content from an end portion of the content by the text after the unfixing of the content; and a display configured to fix or unfix the content based on a command from the processor, wherein the processor determines whether the length change of the content corresponds to the predetermined value by determining that an end portion of the text describing the content is positioned in a predetermined area of the screen by the change of the scroll value after the content is fixed, and when the content is fixed on the screen, a shape or a size of the content displayed is changed or a portion of the text that is associated with the content is highlighted in the text.

\* \* \* \* \*